United States Patent [19]

Bass

[11] Patent Number: 4,493,581

[45] Date of Patent: Jan. 15, 1985

[54] ECCENTRICALLY TIGHTENED LATCH DEVICE

[75] Inventor: Alva W. Bass, Arab, Ala.

[73] Assignee: The United States of America as represented by the Secretary of the Army, Washington, D.C.

[21] Appl. No.: 471,078

[22] Filed: Mar. 1, 1983

[51] Int. Cl.$^3$ .......................... B25G 3/18; F16B 21/00

[52] U.S. Cl. .................................... 403/323; 403/148; 24/270

[58] Field of Search ............. 24/270, 273, 69 R, 71 A, 24/71 ST; 403/322, 323, 330, DIG. 8, 148

[56] References Cited

U.S. PATENT DOCUMENTS

| | | | |
|---|---|---|---|
| 904,184 | 11/1908 | Dreese | 24/273 |
| 1,086,474 | 2/1914 | Smith | 403/148 |
| 1,128,585 | 2/1915 | Christman | 24/270 |
| 1,367,038 | 2/1921 | Gard | 24/273 |
| 1,757,258 | 5/1930 | Mitchell et al. | 403/148 |
| 1,896,549 | 2/1933 | Mahay | 403/148 |
| 3,070,352 | 12/1962 | Welsh | 24/69 R |
| 3,178,211 | 4/1965 | Honroth | 24/71 A |

FOREIGN PATENT DOCUMENTS

| | | | |
|---|---|---|---|
| 2034394 | 6/1980 | United Kingdom | 24/71 ST |

*Primary Examiner*—Andrew V. Kundrat

*Attorney, Agent, or Firm*—Anthony T. Lane; Robert P. Gibson; James T. Deaton

[57] ABSTRACT

The eccentrically and over-center latch device for high load holding capacity and quick release/quick engagement with a low, flat profile which allows the device to be used in small operating clearance.

5 Claims, 5 Drawing Figures

ECCENTRICALLY TIGHTENED LATCH DEVICE

DEDICATORY CLAUSE

The invention described herein may be manufactured, used, and licensed by or for the Government for governmental purposes without the payment to me of any royalties thereon.

BACKGROUND OF THE INVENTION

In the past, strap assembly latch devices of the over-center type have existed in a variety of shapes and sizes and are generally designed so that the path of the tightening and locking member is at right angles to the plane of the parts being held. Therefore, sufficient operating clearance must exist above the mounting plane of the over-center latch for its locking and unlocking operation. Therefore, these latch devices do not meet the requirement of a latch in which the latching device has a motion plane which is parallel to the surface of the parts to be held and of a low profile type.

Accordingly, it is an object of this invention to provide an over-center latching device that has a low profile and a motion plane which is parallel to and close to the surface of the held parts.

Another object of this invention is to provide a latching device which has rotary motion and over-center clamping action.

Still another object of this invention is to provide a low profile latching device which has a spring action built therein to allow the latching device to give to the over-center latching action and at the same time exert sufficient holding force for tightly clamping the held parts.

Other objects and advantages of this invention will be obvious to those skilled in this art.

SUMMARY OF THE INVENTION

In accordance with this invention, an eccentrically tightened latch device is provided which includes a body strap that has a spring action with one end of the body strap adapted to be connected to a strap or a part to be clamped and the other end of the body strap has an opening therein with an eccentric member mounted through the opening in the body strap and integrally connected to a locking lever for rotation of the eccentric member with the locking lever and relative to the body strap. The eccentric member also has a projecting end that is designed to hold a second strap or body member that is to be clamped relative to the first strap or parts. The locking lever is adapted to be rotated relative to the body strap and move the first and second straps or parts relative to each other and move the eccentric member over-center into a locking position. A dimple detent can also be provided on the body strap and the locking lever for holding these members frictionally in a locking position if desired.

DESCRIPTION OF THE PREFERRED EMBODIMENT

Figure 1:
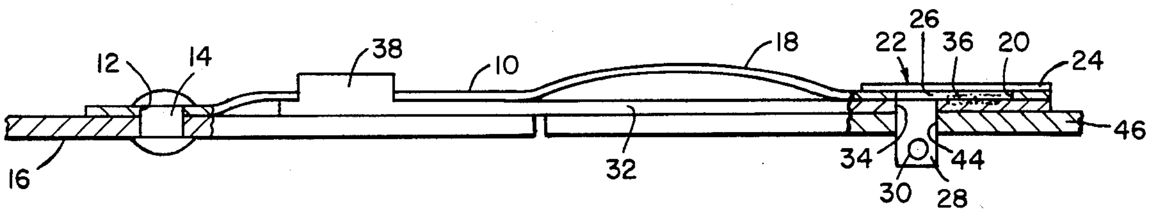
FIG. 1 is a side view partially in section of an eccentrically tightened latch device in accordance with this invention.
Figure 4:
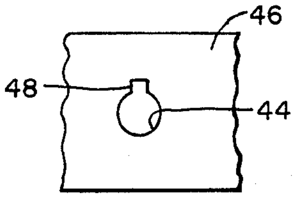
FIG. 4 is a top view of a strap or a member to be held with a portion cut-away and illustrating the opening in this member.
Figure 2:
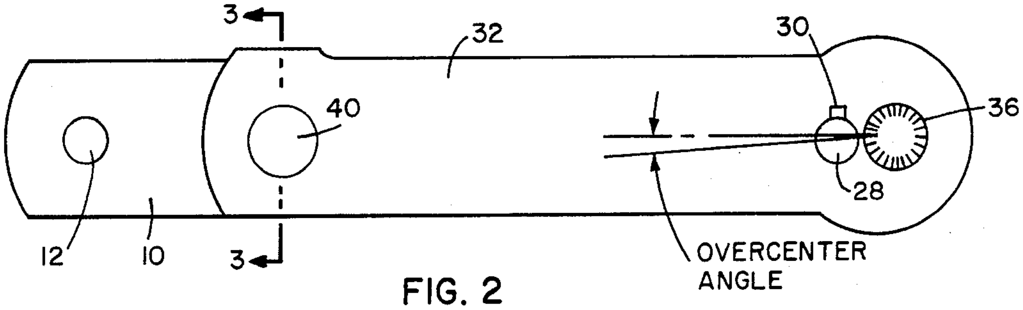
FIG. 2 is a bottom view of the latching device in accordance with this invention.
Figure 3:
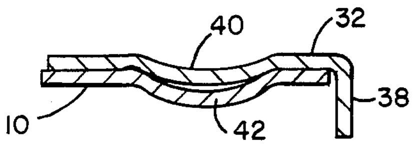
FIG. 3 is a sectional view taken along line 3—3 of FIG. 2.
Figure 5:
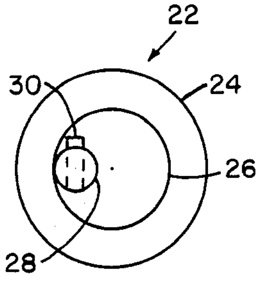
FIG. 5 is a view illustrating the structure of the eccentric member used in this invention.

Referring now to the drawing, the eccentrically tightened latch device includes a body strap 10 that is made of a material such as spring steel and is provided with an opening 12 at one end for being secured, such as by rivet 14, to a strap 16 or other means that is to be clamped. Body strap 10 also has intermediate curved section 18 that is designed to flex and maintain a predetermined force on the parts that are being held together. Also, body strap 10 has an opening 20 through which eccentric member 22 is mounted. Eccentric member 22 includes a first large diameter portion 24 a second stepped diameter portion 26 and an offset holding pin 28 that has a holding tab 30 mounted near one end of pin 28 by being press fitted into a bore within pin 28. A locking lever 32 has a central bore 34 at one end with pin 28 projecting through bore 34 and this end of locking lever 32 is also integrally secured to reduced diameter portion 26 such as by spot welding 36 or other securing means for integrally securing this end of locking lever 32 to reduced diameter portion 26 of eccentric member 22. The other end of locking lever 32 has a stop handle 38 integral therewith for limiting movement of lever 32 toward body strap 10, and locking lever 32 has a dimple portion 40 therein and strap member 10 has a corresponding dimple portion 42 for frictionally holding locking lever 32 and strap 10 in a locking relationship. Pin 28 on eccentric member 22 is secured to locking lever 32 so that pin 28 is at an over-center angle as illustrated in FIG. 2 to positively hold in an over-center relationship. Pin 28 is also designed to be inserted through opening 44 in strap 46 or the other member that is to be clamped relative to strap 16. In this arrangement, lever 32 is actuated approximately 180° from the position illustrated in FIG. 1 so that tab 30 aligns with slot 48 and so that pin 28 and tab 30 can be inserted through opening 44 and slot 48 to connect strap 46 to pin 28. Locking lever 32 can then be rotated to the locking position illustrated in FIG. 1 and tab 30 will prevent strap 46 from being disengaged from pin 28 when in the locking position.

In operation, when it is desired to clamp two straps or members such as members 16 and 46, one end of body strap 10 is connected to the strap to be clamped and pin 28 is inserted through opening 44 and slot 48 to secure strap 46 to the other end of the clamping device. In the position for connection of pin 28 to strap 46, locking lever 32 is rotated to a position approximately 180° from that illustrated in FIG. 1. By rotating lever 32 from the unlocked position to the position illustrated in FIG. 1, lever 32 and eccentric member 22 are rotated relative to body strap 10 and opening 20 within body strap 10 to cause pin 28 to be rotated circumferentially from one side of opening 20 to a position approximately 180° from the open position and in this position cause straps 16 and 46 to be moved toward each other and clamp these straps by the force applied in moving these members together. Pin 28 is moved to an over-center position as illustrated in FIG. 2 in the locking position to insure that the device is held in a clamping position and raised portion 18 of body strap 10 provide elastic deformation of this material and therefore elastic spring holding force of large magnitude to tightly hold straps 16 and 46 together with the device in the locking position. Also, dimples 40 and 42 serve to frictionally hold locking lever 32 and body strap 10 in the locking position. As can be realized, this eccentric latch device has a motion path plane which is parallel to and close to the surface of straps 16 and 46 or the held parts when the device is being placed in the locking position or the unlocked position. This causes a device to be produced which has an advantage that is realized due to the low profile relative to the surface of the parts being held and when being operated to engage or disengage the devices. Clearance above the surface plane of held parts is relatively small and must only be great enough to accommodate the length of eccentric holding pin 28. Consequently, this eccentrically tightened strap device can be used in situtions requiring much less engagement and operating clearance than other present day over-center latching devices.

I claim:

1. An eccentrically tightened latch device comprising a body strap having means at one end for securing to a part to be clamped, and an opening at the other end of said body strap, and eccentric member rotatably mounted in said opening of said body strap and a locking lever integrally secured to said eccentric member for rotating said eccentric member and causing said eccentric member to rotate and change its linear position relative to said body strap, said eccentric member having means thereon for connection to another body part for actuating the body part in the direction of the means on said body strap for securing the body strap to a body part, said locking lever having a stop and handle at the end opposite the end of said locking lever to said eccentric member for limiting motion of said locking lever toward said body strap, and said eccentric member having first and second diameter portions that are concentric and a pin portion that is mounted adjacent the circumference of the smaller of said two diameter portions to provide means for connection to said locking lever and to provide means for connection to the body part.

2. An eccentrically tightened latch device as set forth in claim 1, wherein said pin has a tab mounted therein to provide means for holding the body part.

3. An eccentrically tightened latch device as set forth in claim 2, wherein said locking lever and said eccentric are integrally secured together such that said pin is actuated to an over-center position when said locking lever is actuated to a position relative to said body strap where said handle stop contacts an edge of said body strap.

4. An eccentrically tightened latch device as set forth in claim 3, wherein said body strap is made of spring steel and has an intermediate section that is raised to allow said body strap to provide an elastic spring holding force of large magnitude.

5. An eccentrically tightened latch device as set forth in claim 4, wherein said body strap and said locking lever have dimple detent means that engage and serve to frictionally hold the latching lever and the body strap in a locked position.

* * * * *